Jan. 12, 1960  P. R. GRIMM  2,920,579
VARIABLE CONCENTRATE PROPORTIONER
Filed Feb. 1, 1957
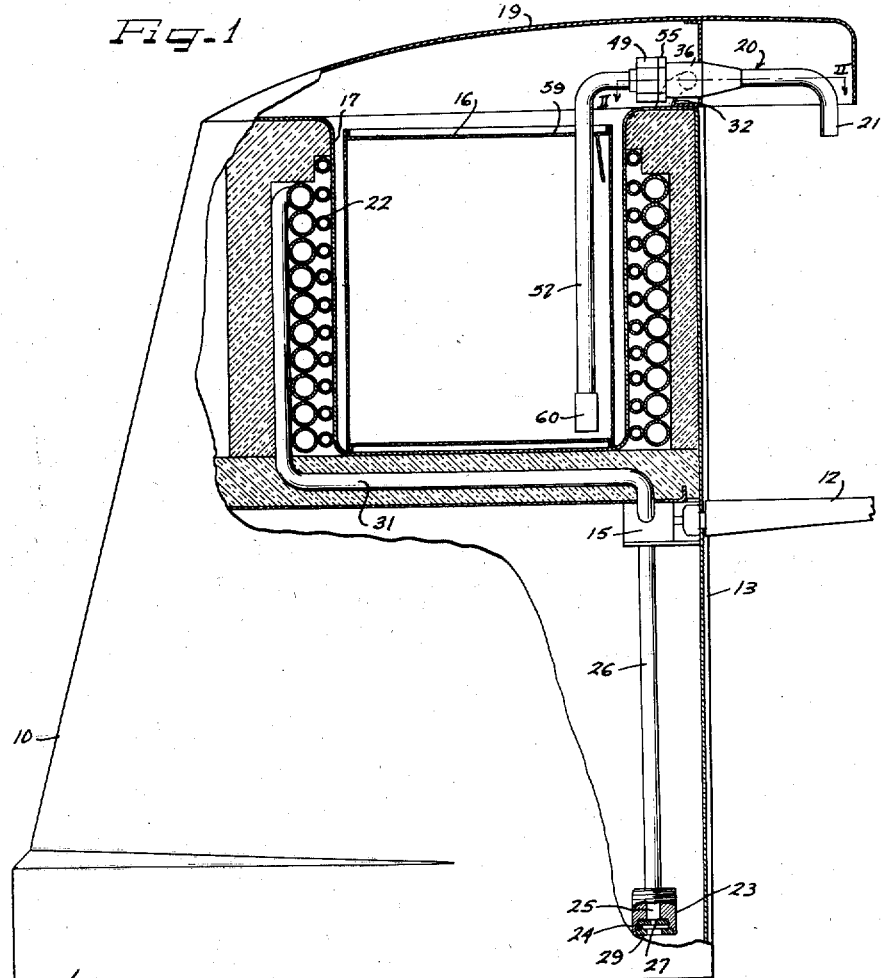
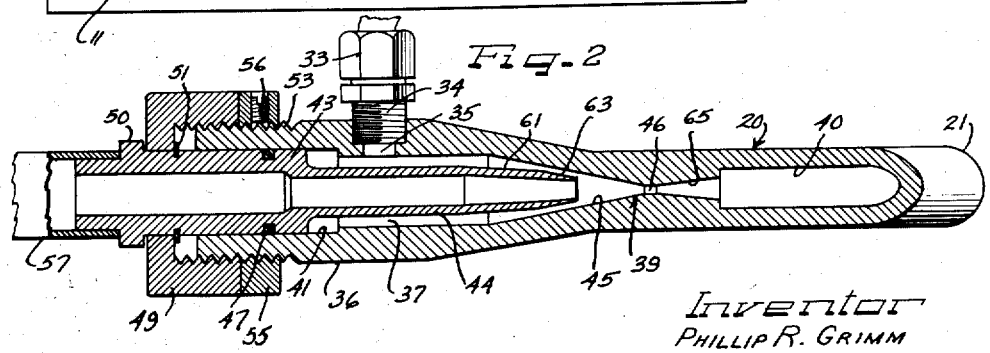
Inventor
PHILLIP R. GRIMM

United States Patent Office 2,920,579
Patented Jan. 12, 1960

2,920,579
VARIABLE CONCENTRATE PROPORTIONER

Phillip R. Grimm, Evanston, Ill., assignor to The Dole Valve Company, Chicago, Ill., a corporation of Illinois Application February 1, 1957, Serial No. 637,753

4 Claims. (Cl. 103—262)

This invention relates to improvements in proportioners for proportioning and dispensing fluids or concentrates and the like.

A principal object of the invention is to provide a novel and improved form of proportioning dispenser operating on the Venturi principle to proportion and mix liquids, in which the two streams travel in the same direction immediately upstream of their juncture.

A further object of the invention is to provide a variable concentrate proportioner operable over a wide range of household pressures.

Still another object of the invention is to provide a concentrate proportioner in which the proportion of the mix may readily be varied in a simpler manner than formerly.

Still another object of the invention is to provide an improved form of Venturi concentrate proportioner efficiently operating on lower pressures than former proportioners.

A still further object of the invention is to provide a variable concentrate proportioner operating on the Venturi principle in which water is admitted on the upstream side of the throat of the Venturi and concentrate is admitted through a tube terminating within the converging portion of the Venturi downstream of the water inlet thereto.

These and other objects of the invention will appear from time to time as the following specification proceeds and with reference to the accompanying drawing wherein:

Figure 1 is a view in side elevation of a concentrate proportioner and dispenser constructed in accordance with the invention, with certain parts broken away and certain other parts shown in vertical section; and Figure 2 is a horizontal sectional view taken through the Venturi proportioner substantially along line II—II of Figure 1.

In the embodiment of the invention illustrated in the drawing, I have shown in Figure 1 a proportioner for proportioning liquids of relatively heavy viscosity with liquids of relatively light viscosity, such as concentrated fruit or vegetable juices, malts, liquors, colas, flavors and the like and to dispense the proportioned liquids at the consistency of the natural fruit, vegetable or like concentrate for drinking purposes.

The proportioner may include a cabinet or casing 10 having a base 11 which may be mounted on a counter or like support. The cabinet 10 is shown as having a glass rest 12 projecting outwardly from a front wall 13 thereof and movably supported to operate a water valve 15 for supplying water to dilute or proportion a concentrate contained in a can or container 16 in a refrigerated tank 17 of the dispenser.

The tank 17 is shown as having a cylindrical wall of sufficient diameter to accommodate the ready insertion and removal of a concentrate can 16 therein and as being of sufficient depth to contain the can. A detachable hood 19 is provided to close the tank 17 and can 16, and is shown as extending over a proportioner 20 constructed in accordance with the invention and having a downwardly turned spout 21 for delivering a proportioned drink upon opening of the valve 15.

Refrigerating coils 22 are shown as encircling the tank 17 for cooling said tank and the can 16 therein. The refrigerating coils 22 may be connected with a compressor and condenser (not shown) of a refrigerating unit, which may be mounted outside of the casing 10 or inside of said casing on the base 11, within the side walls of said casing. The inside of the tank 17 may be made from a corrosion resistant material, such as a stainless steel, which may act as a conductor of cold, to maintain the concentrate cold within the can 16, when the refrigerating unit is shut-off.

A supply connection for water at city pressure is shown as being located adjacent the base 11 and as including a connector 23 which may be threaded on its outside for connection with a source of supply of city water. The connector 23 has an enlarged diameter inlet passageway 24 therein, in communication with a reduced diameter passageway 25 having communication with a pipe 26 leading to the water valve 15, for supplying water thereto.

A resilient annular flow control member 27 is shown as being seated at the junction of the passageway 24 with the passageway 25 on the shoulder formed thereby. A retainer ring 29 on the upstream side of the flow control member 24 is provided to retain said flow control member in position in the passageway 24. The flow control member 27 may be of various well known forms and is herein shown as being a resilient annular flow control member similar to that shown and described in Patent No. 2,389,134, which issued to Clyde A. Brown on November 20, 1945, and is no part of my present invention, so need not herein be shown or described further.

As shown in Figure 1, the valve 15 controls the supply of water to a supply pipe 31 shown as leading upwardly from the valve 15 and then leading horizontally wardly from the valve 15 and then leading horizontally along the bottom of the tank 17 and upwardly along said tank in spaced relation with respect to the side thereof. The pipe 31 then coils downwardly about the refrigerating coils 22 to accommodate the water in said supply pipe to be cooled by said refrigerating coils. The supply pipe 31, coiled about the refrigerating coils 22, terminates adjacent the bottom of the tank 17 into a vertically extending pipe 32 extending upwardly along the tank 17 above the top thereof. The upper portion of the pipe 32 turns in a horizontal direction and has detachable connection with a fitting 33 on the end of a tube 34, threaded within an inlet 35 leading through the wall of a proportioner body 36 of the proportioner 20 into an inlet passageway 37, extending axially along the proportioner body 36.

The proportioner 20 and body 36 thereof may be made from one of the well known thermoplastic materials, preferably a transparent material, such as Lucite or a like material, to enable the detection of dirt within the body. The proportioner body 36 has a Venturi 39 extending therealong forming a continuation of the passageway 37 in axial alignment therewith, and having communication at its discharge end with an outlet passageway 40 leading through the spout 21.

The proportioner body 36 is provided with a socket 41 at its inlet end in axial alignment with the passageway 37 and having a cylindrical wall of a larger diameter than the diameter of said passageway. The socket 41 is adapted to support an enlarged diameter inlet end portion 43 of a suction or concentrate tube 44 and to retain the discharge end of said tube to extend within a converging passageway 45 of the Venturi 39 in axial alignment with the center of a straight throat 46 of said Venturi. An O-ring 47 recessed within the enlarged diameter portion 43 of the concentrate tube 44 is provided to seal said concentrate tube to the socket 41. The O-ring 47 is slightly oversize to maintain the concentrate nozzle in proper alignment with the axial center of the Venturi 39.

An adjustment nut 49 is rotatably mounted on the enlarged diameter portion 43 of the concentrate tube 44 and extends about the inner face of a collar 50, disposed adjacent but spaced inwardly of the rear end of the enlarged diameter portion 43 of the concentrate or suction tube 44. A snap-ring 51 snapped to the enlarged diameter portion 43 of said suction tube in inwardly spaced relation with respect to said collar retains the adjustment nut 49 to said suction tube. The adjustment nut 49 is shown as being threaded on a threaded portion 53 of the proportioner body 36 for adjusting the position of the discharge end of the suction tube 44 with respect to the converging passageway 45 of the Venturi 39. A stop nut 55 threaded on the threaded portion 53 of the proportioner body 36, is provided to limit inward movement of the concentrate tube 44 into a selected position with respect to the converging passageway 45 of the Venturi. A set screw 56 is provided to lock the stop nut 55 in position and thereby limit inward movement of the suction tube 44 along the converging portion 45 of the Venturi.

A suction tube 57 is shown as being mounted on the inlet end of the suction tube 44 and as engaging the outer face of the collar 50. The suction tube 57 is shown as extending rearwardly from the suction tube 44 and downwardly therefrom through a pierced portion 59 of the can 16, and as having an inlet end 60 adjacent and opening to the bottom of said can. Thus, upon the admission of water under pressure through the pipe 32 into the inlet 35 of the proportioner body 36, suction will be developed by the velocity of the water plus the static head of the water and create a vacuum in the inlet end of the concentrate tube 44 to draw concentrate from the bottom of the concentrate can 16.

The suction tube 57 is withdrawn from the pierced portion of the concentrate 16, by lifting the hood 19 and loosening the connector 33 and bodily lifting the proportioner 20 and suction tube 57. The tube 57 having the proportioner 20 thereon is also first inserted in a concentrate can and then is connected to the water pipe 32.

The concentrate tube 44 has a tapered end portion 61 tapering at a relatively flat angle with respect to the axis of said tube and increasing its taper at the discharge end thereof at an angle shown as being substantially equal to the included angle of the converging portion 45 of the Venturi, as indicated by reference character 63. The tube 44 may thus be moved rather close to the throat 46 of the Venturi and as the end of said tube is moved toward the throat 46 of the Venturi the tapered end 63 cooperating with the converging wall of the Venturi will act as a valve and reduce the flow of water along the Venturi.

It should here be understood that due to the configuration of parts and their unique location in the proportioning body, suction is developed at the end of the tube 44 and not at the venturi throat 46. A vacuum cone, as may be supposed from viewing the drawings, is formed interiorly of the annular flow path for pressurized fluid which lies between the surfaces 45 and 63 extended. The throat 46 is provided principally to insure full fluid flow therethrough and to eliminate the suction of any air through the outlet 21.

It should here be understood that at a certain critical position of the end of the tube 44 with respect to the throat of the Venturi, the flow of water along the Venturi will create a maximum vacuum for a given water pressure. Adjustment of said tube away from this position in either direction will reduce the vacuum with a resultant variation in the proportions of the concentrate dispensed through the spout 21.

As the tube 44 is moved from its critical position at which the vacuum is at a maximum toward the throat 46 the water flow will be reduced. This with the resultant decrease in vacuum will result in a stronger solution, since the water flow is reduced at a proportionally greater rate than the vacuum.

Movement of the discharge end portion of the tube 44 away from the throat of the Venturi from its critical position of maximum vacuum will result in a reduced vacuum in the tube 44, but an increase in the water flow, resulting in a weaker solution. The solution may therefore be made stronger or weaker in accordance with the proportions required to mix the proper drink, by adjustment of the discharge end of the tube along the converging portion 45 of the Venturi toward or away from the throat 46 thereof.

The Venturi 39 also has a diverging portion 65 diverging from the throat 46, the included angle between the walls of which is substantially less than the included angle between the walls of the converging portion 45 of the Venturi, and which is greater in length than three times the diameter of the straight throat 46 of the Venturi.

It has been found that for most efficient results, that the critical length of the diverging portion 65 of the Venturi should be at least equal to or greater than three times the diameter of the straight throat of the Venturi and that the included angle of the diverging portion of the Venturi should be between 5 and 7½°.

The critical length of the converging portion of the Venturi should be at least equal to or greater than ten times the diameter of the straight throat of the Venturi, and the included angle of the converging portion of the Venturi should be between 20 and 35°.

The ninety-degree bend at the outlet of the Venturi, forming the spout or nozzle 21 also creates an initial back pressure which effects priming of the Venturi when initially opening the valve 15 to supply water to the inlet 35 and inlet passageway 37.

It may here be seen that a simplified form of concentrate proportioner and dispenser has been provided in which the proportions of the mix of concentrate and water may be varied by varying the position of the discharge end of the concentrate tube 44 with respect to the converging wall portion of the Venturi, and that since the diluting water enters the Venturi upstream of the converging wall portion thereof, and upstream of the discharge end of the concentrate tube 44 that the velocity and static head of the water may both be taken advantage of to develop suction in the concentrate tube 44 in contrast to the prior art dispensers and proportioners in which the static head of the water only is available to develop suction.

It may still further be understood that besides the advantage of reducing the pressures required to proportion the concentrate with water, attained by developing suction by both the velocity and static head of the water, and thereby increasing the efficiency of proportioning, that the proportioner and dispenser is self-priming and that the efficiency thereof is further increased by taking advantage of the critical relationship between the converging and diverging portions of the Venturi with respect to the throat thereof as well as the taper of the end of the proportioning tube, enabling the tube to cooperate with the converging portion of the Venturi and serve as a valve to vary the flow of water through the throat of the Venturi.

While I have herein described the proportioner of my invention as using a liquid of light viscosity to pump a liquid of heavy viscosity, it should be understood that the viscosity of the liquids may be the same or may even be reversed.

It will be understood that modifications and variations in the present invention may be effected without departing from the spirit and scope of the novel concepts thereof.

I claim as my invention:

1. In a device for proportioning and mixing liquids of different viscosities and dispensing of the mixed liquids, a body having a passageway therethrough having a straight throat portion and a portion converging in a downstream direction to said straight throat portion and having a portion diverging in a downstream direction from said throat portion, a suction tube sealed to an end of said body and having a portion extending along said passageway in spaced relation from the inner walls thereof and ending in said converging portion of said passageway, and means for supplying a first liquid under pressure to said passageway to the space between the inner walls thereof and said suction tube to provide flow of said first liquid under pressure in a reducing annular flow path concentrically of said tube along the outer surface thereof and to provide a suction zone inside said annular flow path of said first liquid under pressure and at the end of said suction tube in the converging portion of said passageway to draw a second liquid through said suction tube for mixing with said first liquid, the included angle of said converging portion of said passageway being within the limits of 20° and 35° and the included angle of said diverging portion of said passageway being within the limits of 5° and 7½°.

2. A concentrate proportioner in accordance with claim 1 in which the length of the converging portion of the passageway is equal to at least ten times the diameter of the throat of the passageway.

3. A concentrate proportioner in accordance with claim 1 in which the length of the diverging portion of the passageway is equal to at least three times the diameter of the throat of the passageway.

4. A concentrate proportioner in accordance with claim 1 in which the length of the converging portion of the passageway is at least ten times the diameter of the throat of the passageway and in which the length of the diverging portion of the passageway is at least three times the length of the throat of the passageway.

References Cited in the file of this patent

UNITED STATES PATENTS

| | | |
|---|---|---|
| 175,294 | Messinger | Mar. 28, 1876 |
| 511,079 | Hooker | Dec. 19, 1893 |
| 1,031,289 | Pedley | July 2, 1912 |
| 1,751,343 | Mack | Mar. 18, 1930 |
| 2,399,249 | Perignat | Apr. 30, 1946 |
| 2,705,177 | Waring | Mar. 29, 1955 |
| 2,766,910 | Bauerlin | Oct. 16, 1956 |
| 2,767,727 | Acomb | Oct. 23, 1956 |

FOREIGN PATENTS

| | | |
|---|---|---|
| 431,706 | Great Britain | July 15, 1935 |